US011770758B2

(12) United States Patent
Kimura

(10) Patent No.: US 11,770,758 B2
(45) Date of Patent: Sep. 26, 2023

(54) COMMUNICATION APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Tomohiro Kimura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 17/200,583

(22) Filed: Mar. 12, 2021

(65) Prior Publication Data

US 2021/0204196 A1 Jul. 1, 2021

Related U.S. Application Data

(63) Continuation of application No. 16/179,618, filed on Nov. 2, 2018, now Pat. No. 10,979,964, which is a continuation of application No. 15/222,572, filed on Jul. 28, 2016, now Pat. No. 10,149,233.

(30) Foreign Application Priority Data

Jul. 30, 2015 (JP) ................................. 2015-150510

(51) Int. Cl.
| | |
|---|---|
| *H04W 48/10* | (2009.01) |
| *H04L 67/14* | (2022.01) |
| *H04W 48/16* | (2009.01) |
| *H04W 84/12* | (2009.01) |
| *H04W 88/08* | (2009.01) |

(52) U.S. Cl.
CPC ............. *H04W 48/10* (2013.01); *H04L 67/14* (2013.01); *H04W 48/16* (2013.01); *H04W 84/12* (2013.01); *H04W 88/08* (2013.01)

(58) Field of Classification Search
CPC ..... H04W 48/10; H04W 48/16; H04W 84/12; H04W 88/08; H04L 67/14
See application file for complete search history.

(56) References Cited

U.S. PATENT DOCUMENTS

| | | | |
|---|---|---|---|
| 2005/0279833 A1* | 12/2005 | Tanaka | H04N 1/00278 235/462.46 |
| 2013/0250358 A1* | 9/2013 | Suzuki | H04L 65/1069 358/1.15 |
| 2014/0045472 A1* | 2/2014 | Sharma | H04L 12/1818 455/416 |

* cited by examiner

*Primary Examiner* — Will W Lin
(74) *Attorney, Agent, or Firm* — Canon U.S.A., Inc. IP Division

(57) ABSTRACT

A communication apparatus having a direct wireless communication function includes a generation unit configured to generate a first two-dimensional code including an address of the communication apparatus and an SSID corresponding to the direct wireless communication function, and a second two-dimensional code including the address of the communication apparatus and not including the SSID corresponding to the direct wireless communication function, and an output unit configured to output the first two-dimensional code and the second two-dimensional code.

37 Claims, 9 Drawing Sheets

300 MENU SCREEN

310 SETTING SCREEN

DIRECT CONNECTION SCREEN 400

DIRECT CONNECTION SCREEN 410

INFRASTRUCTURE CONNECTION SCREEN 420

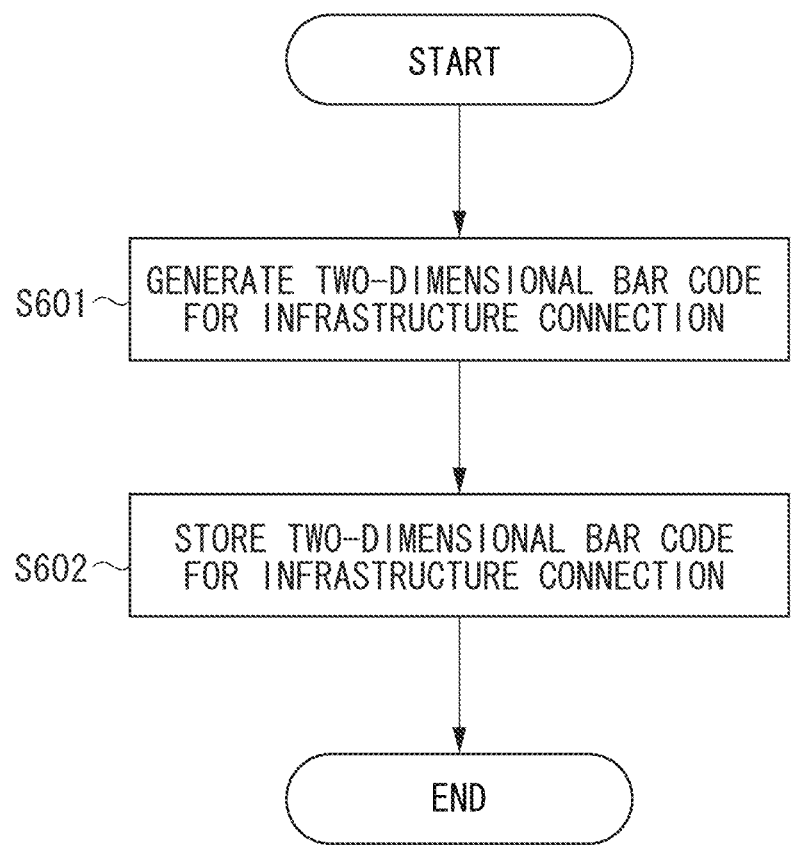

COMMUNICATION APPARATUS, CONTROL METHOD OF COMMUNICATION APPARATUS, AND STORAGE MEDIUM

CROSS-REFERENCE TO RELATED APPLICATIONS

This application is a continuation application of U.S. patent application Ser. No. 16/179,618 filed on Nov. 2, 2018, which claims the benefit of U.S. patent application Ser. No. 15/222,572 filed on Jul. 28, 2016 and issued as U.S. Pat. No. 10,149,233, which claims the benefit of Japanese Patent Application No. 2015-150510, filed Jul. 30, 2015, all of which are hereby incorporated by reference herein in their entirety.

BACKGROUND OF THE INVENTION

Field of the Invention

The present invention relates to a communication apparatus, a control method of a communication apparatus, and a storage medium.

Description of the Related Art

Various communication apparatuses such as a smartphone, a digital camera, and a printing apparatus each have a wireless local area network (LAN) function. A communication apparatus with the wireless LAN function can establish wireless communication by connecting to an access point.

When using the wireless LAN function, a user has to carry out some work, e.g., inputting a service set identifier (SSID) of a desired access point into the communication apparatus, or selecting a desired access point from a list of access points in a search result.

As a way of reducing work for the user, there is known a technique for causing the communication apparatus to display an SSID of an access point as a two-dimensional bar code. Japanese Patent Application Laid-Open No. 2006-261938 discusses a configuration in which wireless communication between a communication apparatus and a mobile terminal is readily established by causing the mobile terminal to read such a two-dimensional bar code.

When the mobile terminal reads the two-dimensional bar code including the SSID of the access point, a network changeover to a network to which the mobile terminal is to be connected occurs. If the mobile terminal is already connected to a network capable of communicating with the communication apparatus, an unnecessary network changeover occurs when the mobile terminal reads the two-dimensional bar code including the SSID of the access point. When the unnecessary network changeover occurs, the user may be prompted to carry out additional work such as re-entering authentication information for connection to the network.

SUMMARY OF THE INVENTION

According to an aspect of the present invention, a communication apparatus having a direct wireless communication function includes a generation unit configured to generate a first two-dimensional code including an address of the communication apparatus and an SSID corresponding to the direct wireless communication function, and a second two-dimensional code including the address of the communication apparatus and not including the SSID corresponding to the direct wireless communication function, and an output unit configured to output the first two-dimensional code and the second two-dimensional code.

Further features of the present invention will become apparent from the following description of exemplary embodiments with reference to the attached drawings.

BRIEF DESCRIPTION OF THE DRAWINGS

FIG. 6 is a flowchart illustrating processing for generating a two-dimensional bar code for infrastructure connection.

DESCRIPTION OF THE EMBODIMENTS

Exemplary embodiments of the present invention will be described in detail below with reference to the drawings. The following exemplary embodiments do not limit the invention according to the claims, and not all combinations of features described in the exemplary embodiments are necessary for a solution of the invention.

Figure 1:
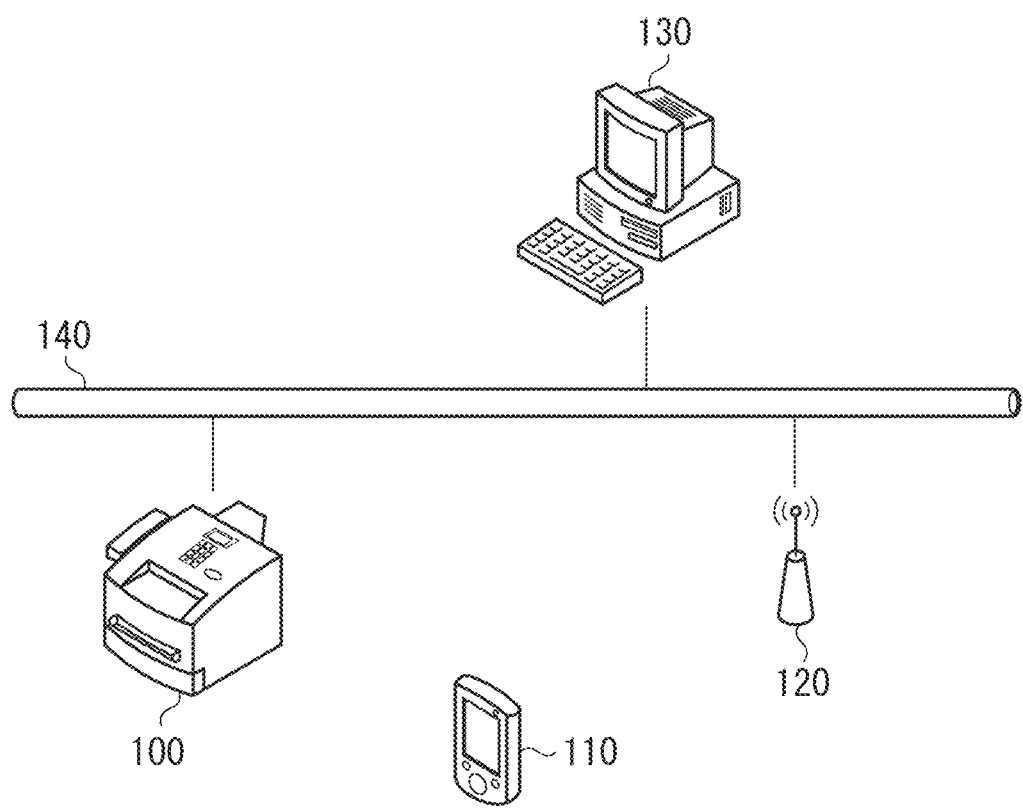
FIG. 1 is a diagram illustrating a configuration of a print system.

First, a configuration of a print system according to a first exemplary embodiment will be described with reference to FIG. 1. A printing apparatus 100 is connected to a network 140, and capable of communicating with an external apparatus such as a personal computer (PC) 130 and a mobile terminal 110 via the network 140. The PC 130 transmits print data to the printing apparatus 100 via the network 140. The mobile terminal 110 transmits print data to the printing apparatus 100 via an access point 120. When the printing apparatus 100 receives the print data, the printing apparatus 100 executes print processing based on the received print data.

Further, the printing apparatus 100 is capable of operating in an access point mode. When the printing apparatus 100 operates in the access point mode, the printing apparatus 100 generates a service set identifier (SSID) and serves as an access point. When the mobile terminal 110 is connected to the SSID generated by the printing apparatus 100, direct wireless communication can be established between the printing apparatus 100 and the mobile terminal 110, without intervention of a relay apparatus such as the access point 120.

Figure 2:
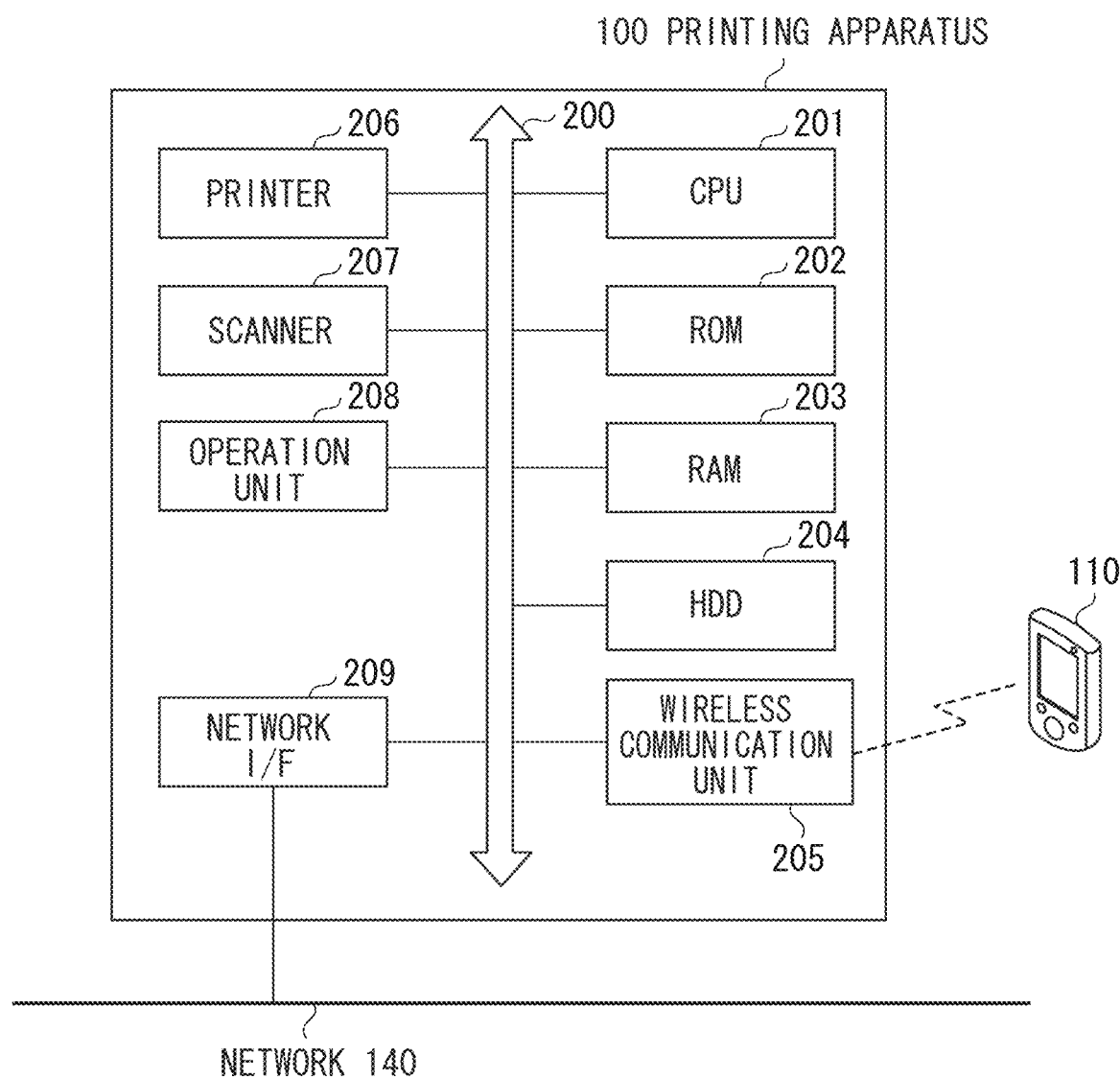
FIG. 2 is a diagram illustrating a hardware configuration of a printing apparatus.

Next, a configuration of the printing apparatus 100 will be described with reference to FIG. 2. The printing apparatus 100 of the present exemplary embodiment is assumed to be a multifunction peripheral that has both of a printing function and a scanning function, but may be a printer without a scanning function.

A central processing unit (CPU) 201 reads out a control program stored in a read only memory (ROM) 202, and thereby executes various kinds of processing for controlling operation of the printing apparatus 100. The CPU 201 is connected to other units by a bus 200. The ROM 202 stores the control program. A random access memory (RAM) 203 is used as a temporary storage area such as a main memory and a work area of the CPU 201. A hard disk drive (HDD) 204 is a nonvolatile storage medium for storing various data such as print data and a scanned image.

In the printing apparatus 100, a single CPU, namely, the CPU 201, is assumed to execute each process in each flowchart to be described below, but other mode may be adopted. For example, one or more CPUs may execute each process in the flowchart to be described below, by working together. Further, all or part of processing in the flowchart may be executed using a hardware circuit.

A wireless communication unit 205 has a wireless local area network (LAN) function, and executes wireless communication with the access point 120. Further, the wireless communication unit 205 is capable of operating in the access point mode. When the wireless communication unit 205 operates in the access point mode, the wireless communication unit 205 serves as an access point so that direct wireless communication can be established between the mobile terminal 110 and the printing apparatus 100.

A printer 206 executes print processing on a sheet, based on data such as print data received from the external apparatus and a scanned image generated by a scanner 207. The scanner 207 generates the scanned image by reading a document. The scanned image generated by the scanner 207 is printed by the printer 206 or stored into the HDD 204.

An operation unit 208 includes a liquid crystal display having a touch panel function and a keyboard, and displays various operation screens. A user can input instructions and information into the printing apparatus 100 via the operation unit 208.

A network interface (I/F) 209 is connected to the network 140 by a LAN cable, and executes communication with an external apparatus (e.g., the PC 130) on the network. The network I/F 209 receives print data transmitted from the external apparatus, and the printer 206 executes the print processing based on the received print data.

The printing apparatus 100 is taken as an example of a communication apparatus capable of operating in an access point mode. However, a communication apparatus to which the present invention is applicable is not limited to the printing apparatus 100. The present invention is applicable to any of various electronic devices such as a digital camera, a video camera, a smartphone, and a tablet PC, if the electronic device is capable of operating in the access point mode.

When connecting the mobile terminal 110 to the printing apparatus 100 operating in the access point mode, the user needs to input the SSID of the printing apparatus 100 into the mobile terminal 110, or select the SSID of the printing apparatus 100 from a list of access points in a search result. The printing apparatus 100 displays a two-dimensional bar code including the SSID of the printing apparatus 100 to eliminate such work. Further, the printing apparatus 100 can also display a two-dimensional bar code not including an SSID, according to an instruction of the user. In other words, the printing apparatus 100 of the present exemplary embodiment can switch between displaying the two-dimensional bar code including the SSID and displaying the two-dimensional bar code not including the SSID, according to an instruction of the user. Such display of the two-dimensional bar code will be described in detail below.

Figure 3A:
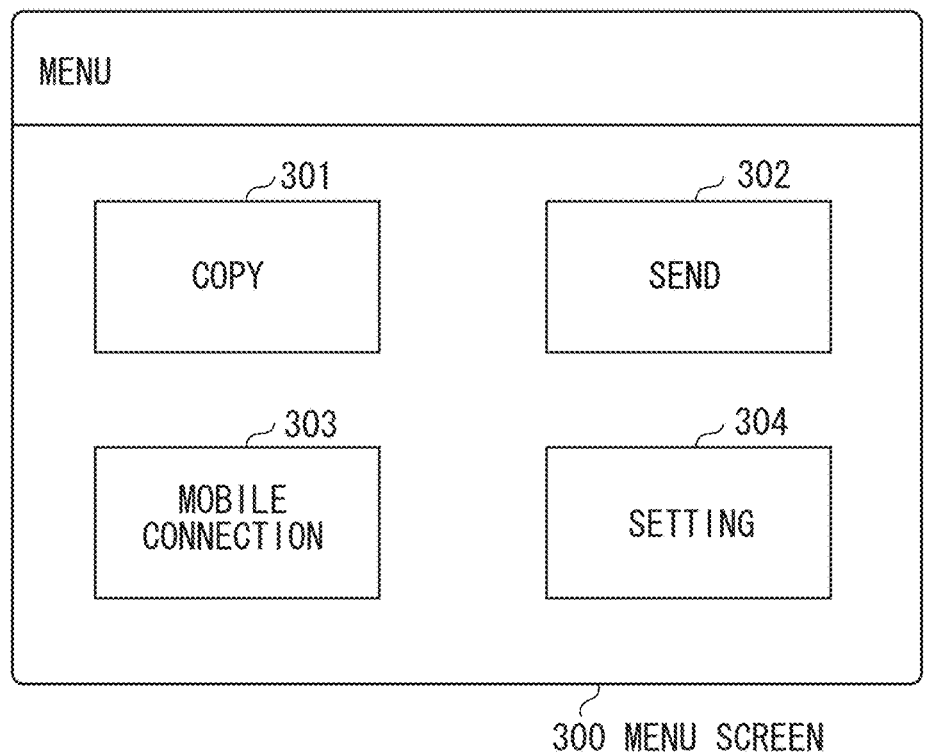
FIGS. 3A and 3B are diagrams each illustrating a screen displayed by the printing apparatus.

First, a screen to be displayed by the printing apparatus 100 will be described with reference to FIGS. 3A and 3B. A menu screen 300 in FIG. 3A is a screen to be displayed by the operation unit 208. The menu screen 300 is used as an initial window, which is displayed first when the printing apparatus 100 is activated.

A button 301 is provided to use a copy function. When the user selects the button 301, a copy screen is displayed. A button 302 is provided to use a SEND function (a function for transmitting an image generated by scanning a document with the scanner 207 to the external apparatus on the network 140). When the user selects the button 302, a SEND screen is displayed. A button 304 is provided to display various setting screens.

Figure 3B:
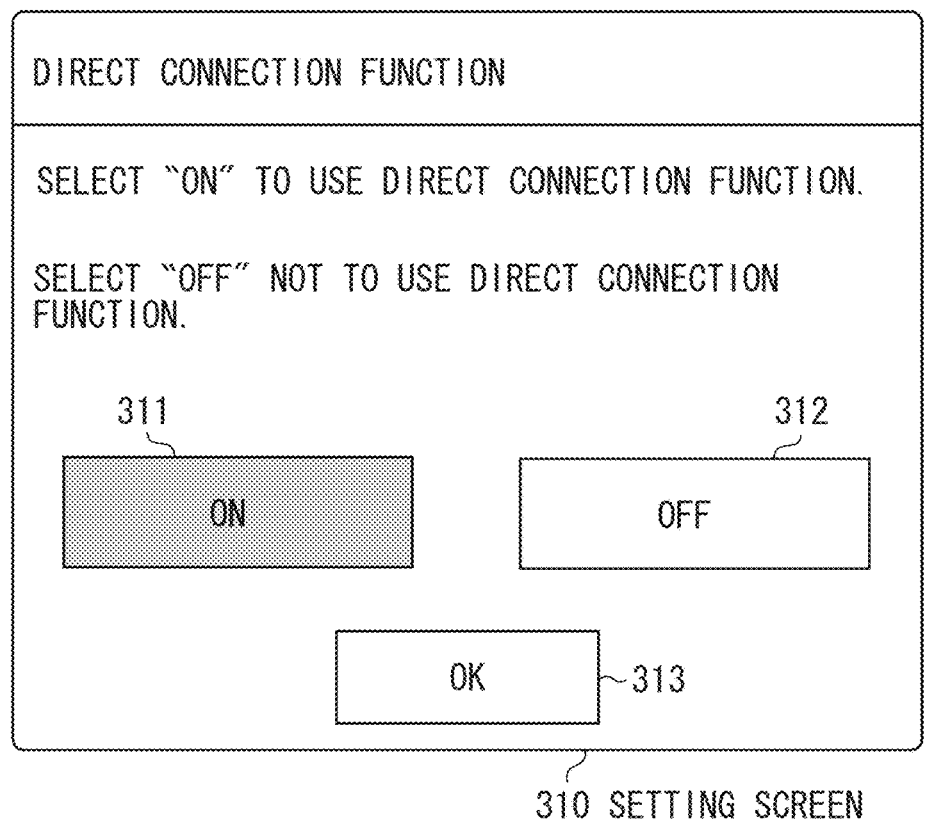

A setting screen 310 in FIG. 3B is provided to set permission or prohibition of the access point mode, among setting items that are displayed when the button 304 is selected on the menu screen 300. In FIG. 3B, the access point mode is referred to as "direct connection function".

When the user (e.g., a system administrator) selects a button 311 on the setting screen 310, operating in the access point mode is permitted. When permitting general users to use the access point mode, the system administrator may only select the button 311. On the other hand, when the user (e.g., a system administrator) selects a button 312 on the setting screen 310, operating in the access point mode is prohibited. When not permitting general users to use the access point mode, the system administrator may only select the button 312. When the user selects an OK button 313, the result of the setting made via the setting screen 310 is stored into the HDD 204.

Referring back to FIG. 3A, the menu screen 300 will be further described. When the user selects a button 303 on the menu screen 300, either a direct connection screen or an infrastructure connection screen, which will be described below with reference to FIGS. 4A, 4B, 4C, 5A, and 5B, is displayed. In each of the direct connection screen and the infrastructure connection screen, a two-dimensional bar code for connecting the mobile terminal 110 to the printing apparatus 100 is displayed. Which one of the direct connection screen and the infrastructure connection screen is to be initially displayed when the user selects the button 303 is determined by the result of the setting made via the setting screen 310. When the direct connection function is set to "ON", i.e., when the use of the access point mode is permitted, the printing apparatus 100 initially displays the direct connection screen. This screen transition will be described with reference to FIGS. 4A, 4B, and 4C. On the other hand, when the direct connection function is set to "OFF", i.e., when the use of the access point mode is prohibited, the printing apparatus 100 initially displays the infrastructure connection screen. This screen transition will be described with reference to FIGS. 5A and 5B.

Figure 4A:
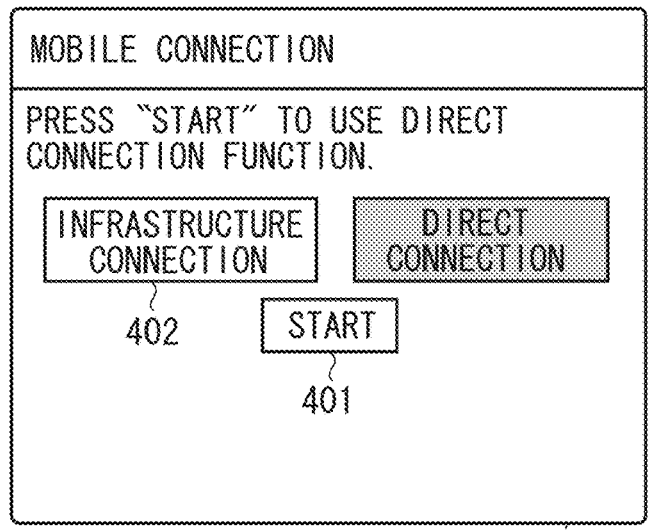
FIGS. 4A, 4B, and 4C are diagrams each illustrating a screen displayed by the printing apparatus.
Figure 4B:
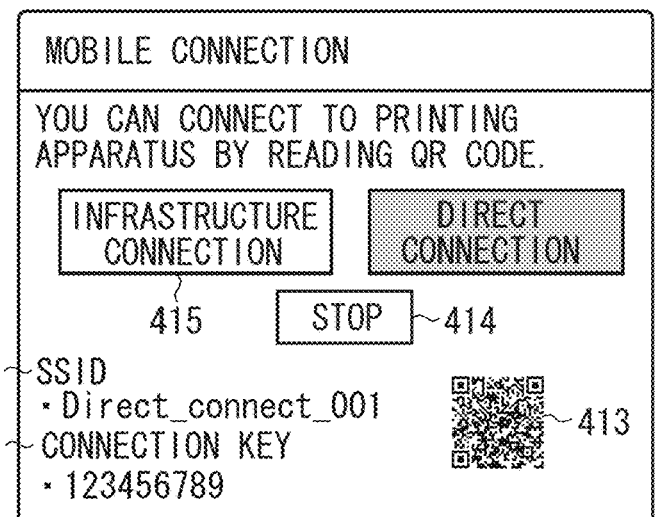
Figure 4C:
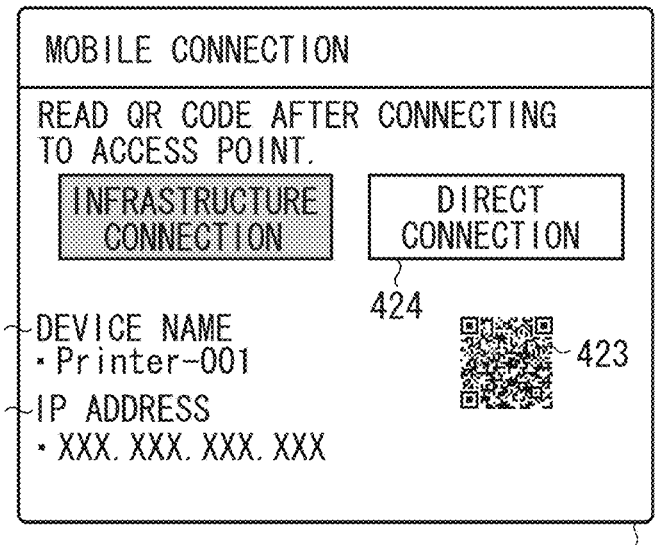

FIGS. 4A, 4B, and 4C will be described. Each of FIGS. 4A, 4B and 4C represent an operational mode where the direct connection function is set to "ON". When the direct connection function is set to "ON", the printing apparatus 100 displays a direct connection screen 400 in FIG. 4A in response to the selection of the button 303. The direct connection screen 400 is displayed because the direct connection function is set to "ON" and the user is expected to use the access point mode.

When the user selects a start button 401 on the direct connection screen 400, the printing apparatus 100 starts operation in the access point mode. Further, the printing apparatus 100 generates an SSID, a connection key (e.g., a Wired Equivalent Privacy (WEP) key), and an Internet Protocol (IP) address to be used in the access point mode. Furthermore, the printing apparatus 100 generates a two-dimensional bar code to be described below. The printing apparatus 100 then displays a direct connection screen 410 illustrated in FIG. 4B.

On the direct connection screen 410 in FIG. 4B, an SSID 411 and a connection key 412 represent the SSID and the connection key generated by the printing apparatus 100, respectively. Further, the direct connection screen 410 displays a two-dimensional bar code 413. The two-dimensional bar code 413 is a Quick Response (QR) Code®, and is generated by the printing apparatus 100 based on the SSID and the connection key to be used in the access point mode. The mobile terminal 110 can recognize the SSID, the connection key, and the IP address generated by the printing apparatus 100, by reading the two-dimensional bar code 413 by using a camera function. The mobile terminal 110 can subsequently establish wireless communication with the printing apparatus 100, by connecting to the SSID.

When the user selects a stop button 414 on the direct connection screen 410, the printing apparatus 100 ends the operation in the access point mode. The direct connection screen 410 displayed by the printing apparatus 100 then transitions to the direct connection screen 400.

When the user selects a button 402 on the direct connection screen 400 or when the user selects a button 415 on the direct connection screen 410, the printing apparatus 100 displays an infrastructure connection screen 420 illustrated in FIG. 4C. On the infrastructure connection screen 420, a device name 421 and an IP address 422 represent a device name of the printing apparatus 100 and the IP address of the printing apparatus 100, respectively.

Further, the infrastructure connection screen 420 displays a two-dimensional bar code 423. The two-dimensional bar code 423 is a QR code (registered trademark), as with the two-dimensional bar code 413 on the direct connection screen 410. However, an SSID of an access point is not included in the two-dimensional bar code 423. The two-dimensional bar code 423 is generated by the printing apparatus 100, based on the IP address of the printing apparatus 100. The mobile terminal 110 can recognize the IP address of the printing apparatus 100, by reading the two-dimensional bar code 423 by using a camera function. The mobile terminal 110 can subsequently transmit print data to the printing apparatus 100 to a destination, by using the recognized IP address as the destination.

When the user selects a button 424 on the infrastructure connection screen 420, the printing apparatus 100 displays the direct connection screen 400 in FIG. 4A or the direct connection screen 410 in FIG. 4B. When the printing apparatus 100 has already started the operation in the access point mode, the printing apparatus 100 displays the direct connection screen 410 in FIG. 4B, in response to the selection of the button 424 by the user. On the other hand, when the printing apparatus 100 is not in the operation in the access point mode, the printing apparatus 100 displays the direct connection screen 400 in FIG. 4A, in response to the selection of the button 424 by the user.

When the direct connection function is set to "ON", the user can switch between displaying the two-dimensional bar code 413 and displaying the two-dimensional bar code 423, by using the button 402, the button 415, and the button 424. When the user desires to establish wireless communication with the printing apparatus 100 in the access point mode, the user may only cause display of the two-dimensional bar code 413 for the direct connection. On the other hand, when the user desires to cause the mobile terminal 110 to recognize only the address of the printing apparatus 100 (when the user desires to perform pairing), the user may only cause display of the two-dimensional bar code 423 for the infrastructure connection.

Figure 5A:
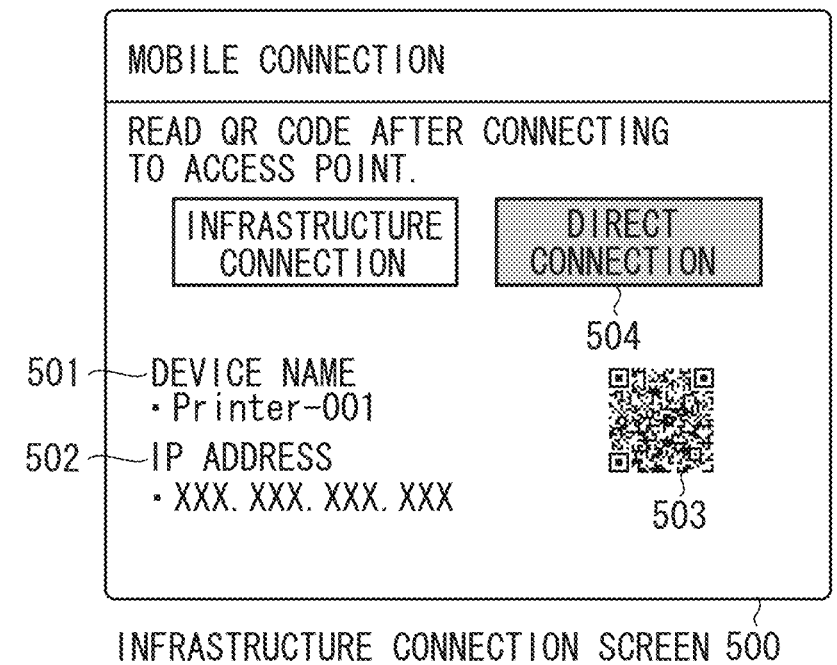
FIGS. 5A and 5B are diagrams each illustrating a screen displayed by the printing apparatus.
Figure 5B:
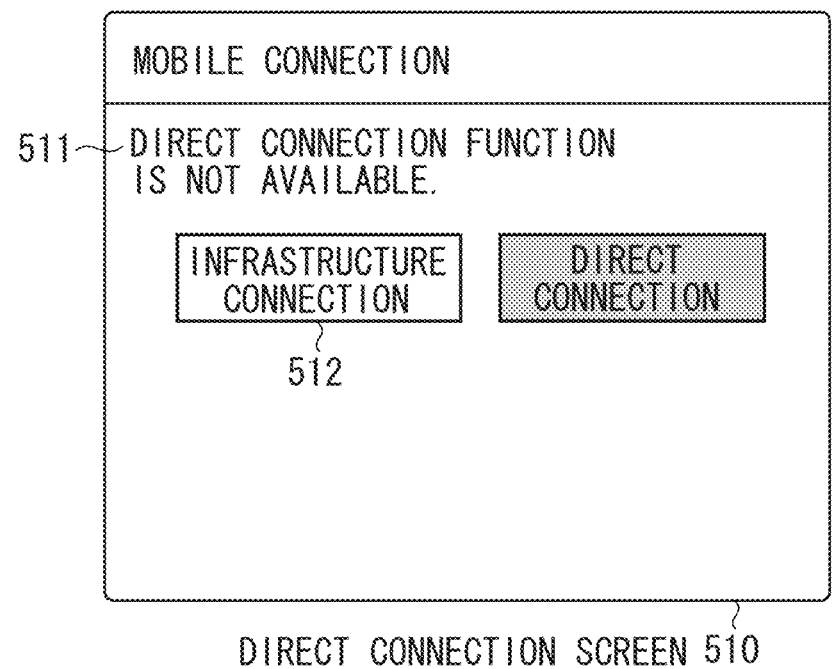

Next, FIGS. 5A and 5B will be described. FIGS. 5A and 5B represent an operational mode where the direct connection function is set to "OFF". When the direct connection function is set to "OFF", the printing apparatus 100 displays an infrastructure connection screen 500 illustrated in FIG. 5A, in response to the selection of the button 303. The infrastructure connection screen 500 is displayed because the use of the access point mode is prohibited.

The infrastructure connection screen 500 is similar to the infrastructure connection screen 420 in FIG. 4C. On the infrastructure connection screen 500, a device name 501 and an IP address 502 represent the device name of the printing apparatus 100 and the IP address of the printing apparatus 100, respectively. Further, the infrastructure connection screen 500 displays a two-dimensional bar code 503. The two-dimensional bar code 503 is a QR Code®, and is generated by the printing apparatus 100, based on the IP address of the printing apparatus 100.

When the user selects a button 504 on the infrastructure connection screen 500, the printing apparatus 100 displays a direct connection screen 510 illustrated in FIG. 5B. On the direct connection screen 510, the direct connection function is set to "OFF", i.e., the use of the access point mode is prohibited. Therefore, a message 511 indicating that the access point mode cannot be used is displayed. Further, unlike the direct connection screen 400, the start button 401 is not displayed on the direct connection screen 510. When the user selects a button 512 on the direct connection screen 510, the printing apparatus 100 displays the infrastructure connection screen 500 illustrated in FIG. 5A.

As described above, when the direct connection function is set to "ON", the printing apparatus 100 can display both of the two-dimensional bar code 413 including the SSID and the two-dimensional bar code 423 not including the SSID.

In addition, the user can select which one of the two-dimensional bar code 413 including the SSID and the two-dimensional bar code 423 not including the SSID is to be used, depending on the use intended by the user. For example, when the mobile terminal 110 is not connected to the same network as the network to which the printing apparatus 100 is connected, it is desirable for the user to use the two-dimensional bar code 413 including the SSID. For the user, this reduces the work of inputting an SSID into the mobile terminal 110 or selecting a desired SSID from access points in a search result.

On the other hand, when the mobile terminal 110 is already connected to the same network as the network to which the printing apparatus 100 is connected, it is desirable for the user to use the two-dimensional bar code 423 not including the SSID. When the mobile terminal 110 reads a two-dimensional bar code including an SSID, a network changeover to a network to which the mobile terminal 110 is to be connected occurs. By using the two-dimensional bar code 423 not including the SSID, occurrence of such an unnecessary network changeover can be prevented. Therefore, the user can avoid being prompted to re-enter authentication information for connection to the network.

Next, processing for generating and displaying each of the two-dimensional bar code including the SSID (the two-dimensional bar code 423, and the two-dimensional bar code 503) and the two-dimensional bar code not including the SSID (the two-dimensional bar code 413) will be described. First, the processing for generating and displaying the two-dimensional bar code not including the SSID will be described with reference to FIGS. 6 and 7.

A flowchart in FIG. 6 represents processing to be executed when the printing apparatus 100 is activated. The CPU 201 performs each step illustrated in the flowchart in FIG. 6, by developing and executing the control program, which is stored in the memory such as the ROM 202, on the RAM 203.

First, in step S601, the CPU 201 generates a two-dimensional bar code for infrastructure connection, based on the IP address of the printing apparatus 100. The two-dimensional bar code for infrastructure connection includes the IP address of the printing apparatus 100, but does not include an SSID of an external access point (e.g., access point 120), as with the two-dimensional bar code 423 and the two-dimensional bar code 503. Next, in step S602, the CPU 201 stores the two-dimensional bar code for infrastructure connection generated in step S601, into the HDD 204.

The configuration for generating the two-dimensional bar code for infrastructure connection at the activation of the printing apparatus 100 is described above with reference to the flowchart in FIG. 6. A new two-dimensional bar code for infrastructure connection is generated also when the IP address of the printing apparatus 100 is changed. The generated two-dimensional bar code is stored into the HDD 204.

Figure 7:
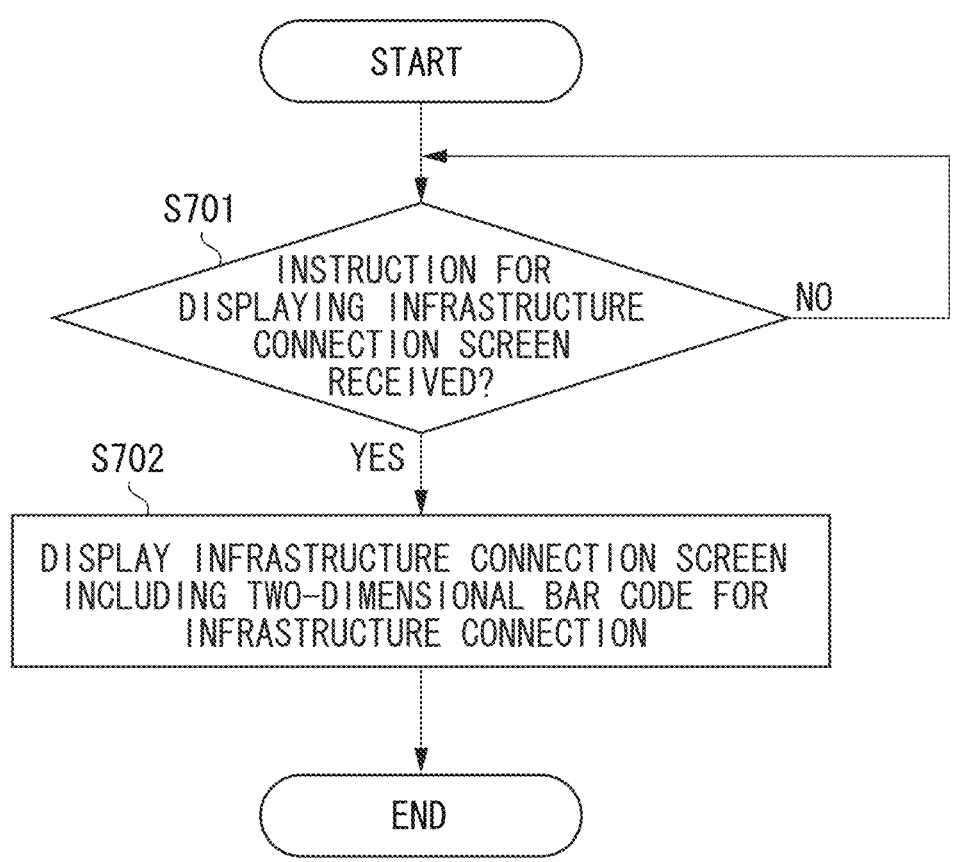
FIG. 7 is a flowchart illustrating processing for displaying the two-dimensional bar code for infrastructure connection.

Next, a configuration for displaying the two-dimensional bar code for infrastructure connection will be described with reference to a flowchart in FIG. 7. The CPU 201 performs each step in the flowchart illustrated in FIG. 7, by developing and executing the control program, which is stored in the memory such as the ROM 202, on the RAM 203.

In step S701, the CPU 201 determines whether an instruction for displaying an infrastructure connection screen is received from the user. The infrastructure connection screen of the present exemplary embodiment is the infrastructure connection screen 420 in FIG. 4C or the infrastructure connection screen 500 in FIG. 5A. When an instruction for displaying either of these screens is received from the user, the CPU 201 determines that an instruction for displaying the infrastructure connection screen is received from the user (YES in step S701), and the processing proceeds to step S702. On the other hand, when an instruction for displaying the infrastructure connection screen 420 or the infrastructure connection screen 500 is not received from the user (NO in step S701), the CPU 201 waits until receipt of an instruction for displaying the infrastructure connection screen 420 or the infrastructure connection screen 500 from the user.

Next, in step S702, the CPU 201 displays the infrastructure connection screen including the two-dimensional bar code for infrastructure connection (the two-dimensional bar code stored in step S602). In the present exemplary embodiment, the CPU 201 controls the operation unit 208 to display the infrastructure connection screen 420 in FIG. 4C or the infrastructure connection screen 500 in FIG. 5A. Accordingly, the user can cause the mobile terminal 110 to read the two-dimensional bar code for infrastructure connection.

Figure 8:
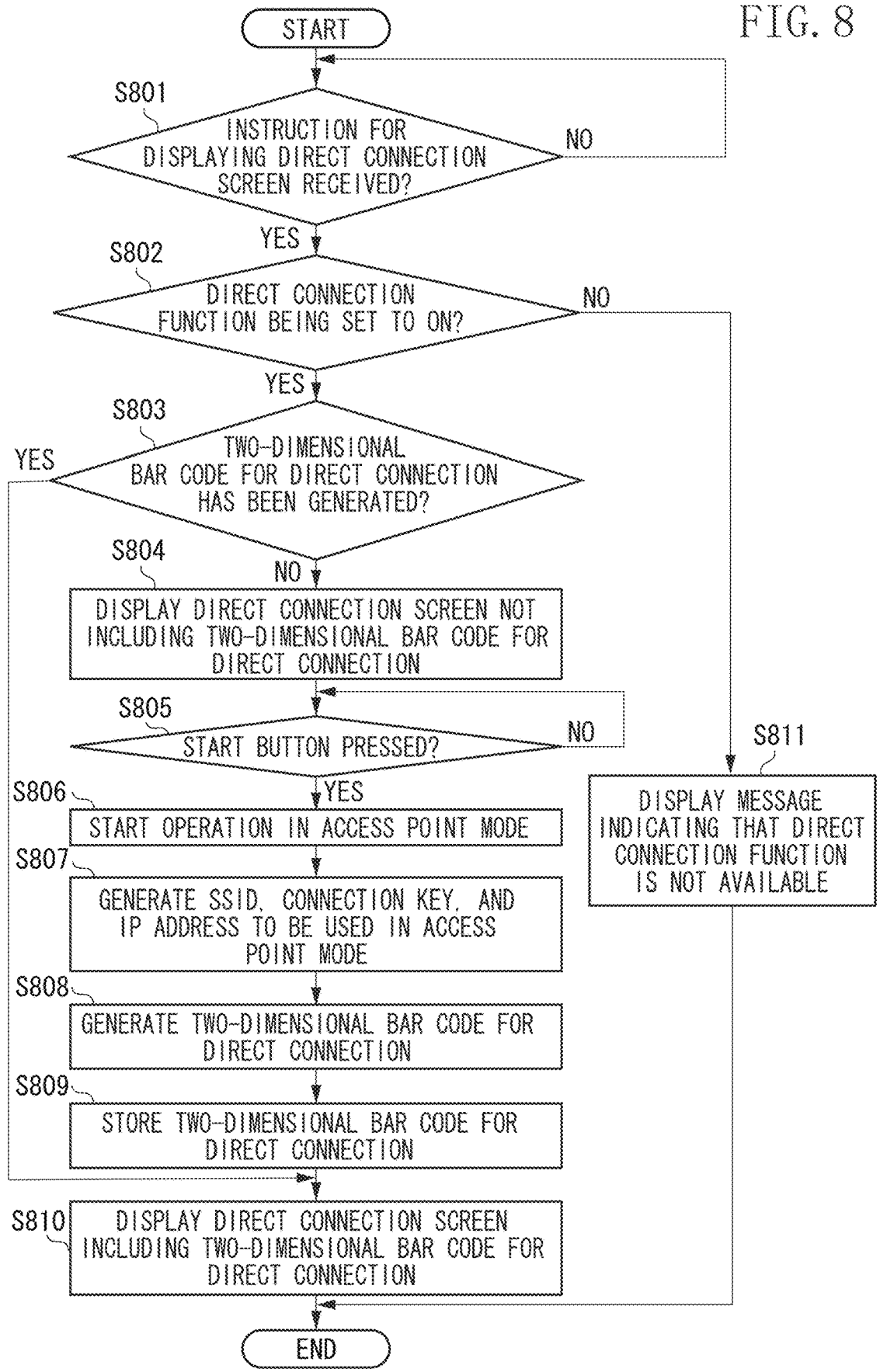
FIG. 8 is a flowchart illustrating processing for generating and displaying a two-dimensional bar code for direct connection.

Next, the processing for generating and displaying the two-dimensional bar code including the SSID will be described with reference to FIG. 8. The CPU 201 performs each step in a flowchart illustrated in FIG. 8, by developing and executing the control program, which is stored in the memory such as the ROM 202, on the RAM 203.

In step S801, the CPU 201 determines whether an instruction for displaying a direct connection screen is received from the user. The direct connection screen of the present exemplary embodiment is any of the direct connection screen 400 in FIG. 4A, the direct connection screen 410 in FIG. 4B, and the direct connection screen 510 in FIG. 5B. When an instruction for displaying any of these screens is received from the user, the CPU 201 determines that an instruction for displaying the direct connection screen is received from the user (YES in step S801), and the processing proceeds to step S802. On the other hand, when an instruction for displaying the direct connection screen 400, the direct connection screen 410, or the direct connection screen 510 is not received from the user (NO in step S801), the CPU 201 waits until receipt of an instruction for displaying any of these screens from the user.

Next, in step S802, the CPU 201 determines whether the direct connection function is set to ON. The CPU 201 executes the process in step S802, by confirming the result of the setting made via the setting screen 310 illustrated in FIG. 3B. When the direct connection function is set to ON (YES in step S802), i.e., when the use of the access point mode is permitted, the processing proceeds to step S803. On the other hand, when the direct connection function is not set to ON (NO in step S802), i.e., when the use of the access point mode is prohibited, the processing proceeds to step S811.

Next, step S803 will be described. In step S803, the CPU 201 determines whether a two-dimensional bar code for direct connection has been generated. The two-dimensional bar code for direct connection includes the IP address of the printing apparatus 100 and an SSID of an access point, as with the two-dimensional bar code 413. When the two-dimensional bar code for direct connection has been generated (YES in step S803), i.e., when the two-dimensional bar code for direct connection is stored in the HDD 204, the processing proceeds to step S810. On the other hand, when the two-dimensional bar code for direct connection has not been generated (NO in step S803), i.e., when the two-dimensional bar code for direct connection is not stored in the HDD 204, the processing proceeds to step S804.

Next, step S804 will be described. In step S804, the CPU 201 displays a direct connection screen including no two-dimensional bar code for direct connection. In the present exemplary embodiment, the CPU 201 controls the operation unit 208 to display the direct connection screen 400 illustrated in FIG. 4A.

Next, in step S805, the CPU 201 determines whether the start button 401 for instructing start of the operation in the access point mode is pressed by the user. When the start button 401 is pressed by the user on the direct connection screen 400 (YES in step S805), the processing proceeds to step S806. On the other hand, when the start button 401 is not pressed by the user on the direct connection screen 400 (NO in step S805), the CPU 201 waits until the user presses the start button 401.

Next, in step S806, the CPU 201 starts the operation in the access point mode. Specifically, the CPU 201 controls the wireless communication unit 205 to start the operation in the access point mode.

Next, in step S807, the CPU 201 generates an SSID, a connection key, and an IP address to be used in the access point mode. As these pieces of information, a random value may be generated or a fixed value set beforehand by the user may be used.

Next, in step S808, the CPU 201 generates a two-dimensional bar code for direct connection, based on the SSID, the connection key, and the IP address generated in step S807.

The two-dimensional bar code generated here is, for example, the two-dimensional bar code 413 illustrated in FIG. 4B.

Next, in step S809, the CPU 201 stores the two-dimensional bar code for direct connection generated in step S808, into the HDD 204. If the processing illustrated in the flowchart in FIG. 8 is executed again after the two-dimensional bar code for direct connection is stored into the HDD 204, it is determined in step S803 that the two-dimensional bar code for direct connection is already generated (YES in step S803).

The two-dimensional bar code for the direct connection stored in step S809 is deleted at predetermined timing. For example, the two-dimensional bar code for the direct connection stored in step S809 is deleted when the stop button 414 in FIG. 4B is pressed by the user, or when the operation in the access point mode is terminated due to a timeout.

Next, in step S810, the CPU 201 displays the direct connection screen including the two-dimensional bar code for direct connection (the two-dimensional bar code stored in step S809). In the present exemplary embodiment, the CPU 201 controls the operation unit 208 to display the direct connection screen 410 illustrated in FIG. 4B. The user can thereby cause the mobile terminal 110 to read the two-dimensional bar code for direct connection. In step 810, the operation unit 208 also displays the direct connection screen 410 illustrated in FIG. 4B, when it is determined in step S803 that the two-dimensional bar code for direct connection is already generated (YES in step S803).

Next, step S811 will be described. When it is determined that the direct connection function is not set to ON (NO in step S802), i.e., when the use of the access point mode is prohibited, the processing proceeds to step S811. In step S811, the CPU 201 displays a message indicating that the direct connection function is not available. More specifically, the CPU 201 controls the operation unit 208 to display the direct connection screen 510 illustrated in FIG. 5B. The message 511 is displayed on the direct connection screen 510. The user can thereby recognize that the direct connection function is not available, i.e., the use of the access point mode is prohibited.

As described above, according to the present exemplary embodiment, the printing apparatus 100 can display both of the two-dimensional bar code including the address and the SSID of the printing apparatus 100 and the two-dimensional bar code including the address of the printing apparatus 100 and not including the SSID. In the present exemplary embodiment, the IP address is described as an example of the address of the printing apparatus 100. However, a media access control (MAC) address of the printing apparatus 100 may be used, or both the IP address and the MAC address may be used.

Moreover, the user can determine which one of the two-dimensional bar code including the SSID and the two-dimensional bar code not including the SSID is to be used, depending the use intended by the user.

A second exemplary embodiment will be described below. In the configuration described in the first exemplary embodiment, the two-dimensional bar code including the SSID and the two-dimensional bar code not including the SSID are each displayed on the operation unit 208 according to an output instruction from the user, but may be output to the user in other mode. For example, the two-dimensional bar code including the SSID and the two-dimensional bar code not including the SSID may each be printed on a sheet to be output to the user.

Figure 9A:
FIGS. 9A and 9B are diagrams each illustrating an example in which a two-dimensional bar code is printed on a sheet.

A sheet 901 in FIG. 9A represents an example of a sheet on which the two-dimensional bar code including the SSID is printed by the printer 206. A two-dimensional bar code 902 printed on the sheet 901 includes the SSID, the connection key, and the IP address of the printing apparatus 100 to be used in the access point mode, as with the two-dimensional bar code 413 in FIG. 4B.

Figure 9B:

Further, a sheet 911 in FIG. 9B represents an example of a sheet on which the two-dimensional bar code not including the SSID is printed by the printer 206. A two-dimensional bar code 912 printed on the sheet 911 includes the IP address of the printing apparatus 100, but does not include an SSID of an access point, as with the two-dimensional bar code 423 in FIG. 4C and the two-dimensional bar code 503 in FIG. 5A.

As described above, the user can also cause the mobile terminal 110 to read a two-dimensional bar code, by printing the two-dimensional bar code on a sheet.

In each of the above-described exemplary embodiments, the access point mode is described as an example of the direct wireless communication mode in which the mobile terminal 110 and the printing apparatus 100 execute the direct wireless communication without intervention of a relay apparatus. However, wireless communication in other scheme may be used. For example, the mobile terminal 110 and the printing apparatus 100 can also execute the direct wireless communication by using Wi-Fi Direct. In the case of using Wi-Fi Direct as well, the printing apparatus 100 generates an SSID, a connection key, and an IP address.

Further, in each of the above-described exemplary embodiments, the QR code (registered trademark) is described as an example of the two-dimensional bar code. However, other type of two-dimensional bar code may be used.

Furthermore, an exemplary embodiment of the present invention can also be implemented by such processing that a program that implements one or more functions of each of the above-described exemplary embodiments is supplied to a system or apparatus via a network or storage medium. One or more processors in a computer of the system or apparatus read the program and execute the read program. Moreover, an exemplary embodiment of the present invention can also be implemented by a circuit (e.g., an application-specific integrated circuit (ASIC)) that implements one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method for a communication apparatus having a direct wireless communication function for wirelessly communicating with an external apparatus directly, the method comprising:
    setting a communication operation mode;
    controlling whether to enable the direct wireless communication function based on at least the set communication operation mode; and
    outputting, in a case where the communication apparatus is in a state where the direct wireless communication function is enabled, a two-dimensional code including a service set identifier (SSID) by using the direct wireless communication function after receiving a predetermined user operation,
    wherein, in a case where the communication apparatus is not in the state where the direct wireless communication function is enabled, the two-dimensional code including the SSID by using the direct wireless communication function is not output.

2. The method according to claim 1, wherein the two-dimensional code further includes a connection key for the direct wireless communication function.

3. The method according to claim 2, wherein the two-dimensional code further includes an address of the communication apparatus.

4. The method according to claim 3, wherein the address of the communication apparatus is an IP address of the communication apparatus.

5. The method according to claim 1, further comprising a display, wherein the outputting is displaying the two-dimensional code on the display.

6. The method according to claim 1, wherein the two-dimensional code is a Quick Response (QR) Code®.

7. The method according to claim 1, the method further comprising:
    generating a two-dimensional code including the SSID by using the direct wireless communication function.

8. The method according to claim 7,
    wherein, in a case where the control is performed not to enable the direct wireless communication function, the two dimensional code including the SSID is not generated.

9. The method according to claim 1, wherein
    the direct wireless communication function is a function for causing the communication apparatus to function as an access point to enable direct wireless communication between the communication apparatus and an external apparatus.

10. The method according to claim 1, wherein
    the direct wireless communication function is a function for performing direct wireless communication in accordance with a Wi-Fi Direct® standard.

11. The method according to claim 1, wherein the communication apparatus is a printing apparatus.

12. The method according to claim 1, wherein the communication apparatus is an image capturing apparatus.

13. The method according to claim 1, wherein,
    in a case where the communication apparatus is not in the state where the direct wireless communication function and a setting that uses the direct wireless communication function is not set to be enabled as the communication operation mode, a user is notified that the direct wireless communication is unusable.

14. The method according to claim 1, wherein the communication apparatus is able to output another two-dimensional code including an address of the communication apparatus but not including the SSID even when the communication apparatus is not in the state where the direct wireless communication function is enabled.

15. A communication apparatus having a direct wireless communication function for wirelessly communicating with an external apparatus directly, the communication apparatus comprising:
    at least one memory that stores a set of instructions; and
    at least one processor that executes the instructions, the instructions, when executed, causing the information processing apparatus to perform operations comprising:
    setting a communication operation mode;
    controlling whether to enable the direct wireless communication function based on at least the set communication operation mode
    outputting, in a case where the communication apparatus is in a state where the direct wireless communication function is enabled, a two-dimensional code including a service set identifier (SSID) by using the direct wireless communication function after receiving a predetermined user operation,
    wherein, in a case where the communication apparatus is not in the state where the direct wireless communication function is enabled, the two-dimensional code including the SSID by using the direct wireless communication function is not output.

16. The communication apparatus according to claim 15, wherein the two-dimensional code further includes a connection key for the direct wireless communication function.

17. The communication apparatus according to claim 16, wherein the two-dimensional code further includes an address of the communication apparatus.

18. The communication apparatus according to claim 17, wherein the address of the communication apparatus is an IP address of the communication apparatus.

19. The communication apparatus according to claim 15, further comprising a display, wherein the outputting is displaying the two-dimensional code on the display.

20. The communication apparatus according to claim 15, wherein the two-dimensional code is a Quick Response (QR) Code®.

21. The communication apparatus according to claim 15, wherein the at least one memory and at least one processor further causing the information processing apparatus to perform operations comprising:
    generating a two-dimensional code including the SSID by using the direct wireless communication function.

22. The communication apparatus according to claim 21, wherein, in a case where the control is performed not to enable the direct wireless communication function, the two dimensional code including the SSID is not generated.

23. The communication apparatus according to claim 15, wherein the direct wireless communication function is a function for causing the communication apparatus to function as an access point to enable direct wireless communication between the communication apparatus and an external apparatus.

24. The communication apparatus according to claim 15, wherein the direct wireless communication function is a function for performing direct wireless communication in accordance with a Wi-Fi Direct® standard.

25. The communication apparatus according to claim 15, wherein the communication apparatus is a printing apparatus.

26. The communication apparatus according to claim 15, wherein the communication apparatus is an image capturing apparatus.

27. The communication apparatus according to claim 15, wherein the at least one memory and at least one processor further causing the information processing apparatus to perform operations comprising:
  wherein, in a case where the communication apparatus is not in the state where the direct wireless communication function is enabled and a setting that uses the direct wireless communication function is not set to be enabled as the communication operation mode, notifying a user that the direct wireless communication is unusable.

28. The communication apparatus according to claim 15, wherein the communication apparatus is able to output another two-dimensional code including an address of the communication apparatus but not including the SSID even when the communication apparatus is not in the state where the direct wireless communication function is enabled.

29. A non-transitory computer readable storage medium storing a program that causes a computer to execute a controlling method for a communication apparatus having a direct wireless communication function for wirelessly communicating with an external apparatus directly, the control method comprising:
  setting a communication operation mode;
  controlling whether to enable the direct wireless communication function based on at least the set communication operation mode; and
  outputting, in a case where the communication apparatus is in a state where the direct wireless communication function is enabled, a two-dimensional code including a service set identifier (SSID) by using the direct wireless communication function after receiving a predetermined user operation,
  wherein, in a case where the communication apparatus is not in the state where direct wireless communication function is enabled, the two-dimensional code including the SSID by using the direct wireless communication function is not output.

30. A control method for a communication apparatus that provides an access point, the method comprising:
  setting a communication operation mode;
  controlling whether to enable the access point based on at least the set communication operation mode;
  displaying, in a case where the communication apparatus is in a state where the access point is enabled, a two-dimensional code including a service set identifier (SSID) that identifies the access point and a connection key that is used for connection to the access point in response to reception of a predetermined user operation,
  wherein, in a case where the communication apparatus is not in the state where the access point is enabled, the two-dimensional code including the SSID and the connection key is not displayed.

31. The control method according to claim 30, the method further comprising:
  generating the two-dimensional code including a service set identifier (SSID) that identifies the access point and a connection key that is used for connection to the access point.

32. The control method according to claim 31,
  wherein, in a case where the control is performed not to provide enable the access point, the two dimensional code including the SSID and the connection key is not generated.

33. The control method according to claim 30, wherein a message indicating that a connection is possible by reading the two dimensional code is displayed together with the two-dimensional code.

34. A communication apparatus that provides an access point, the communication apparatus comprising:
  at least one memory that stores a set of instructions; and
  at least one processor that executes the instructions, the instructions, when executed, causing the communication apparatus to perform operations comprising:
  setting a communication operation mode;
  controlling whether to enable the access point based on at least the set communication operation mode;
  displaying, in a case where the communication apparatus is in a state where the access point is enabled, a two-dimensional code including a service set identifier (SSID) that identifies the access point and a connection key that is used for connection to the access point in response to reception of a predetermined user operation,
  wherein, in a case where the communication apparatus is not in the state providing the access point is enabled, the two-dimensional code including the SSID and the connection key is not displayed.

35. The communication apparatus according to claim 34, wherein the at least one memory and at least one processor further causing the communication apparatus to perform operations comprising:
  generating the two-dimensional code including a service set identifier (SSID) that identifies the access point and a connection key that is used for connection to the access point.

36. The communication apparatus according to claim 35, wherein, in a case where the control is performed not to enable the access point, the two dimensional code including the SSID and the connection key is not generated.

37. The communication apparatus according to claim 34, wherein a message indicating that a connection is possible by reading the two dimensional code is displayed together with the two-dimensional code.

* * * * *